UNITED STATES PATENT OFFICE.

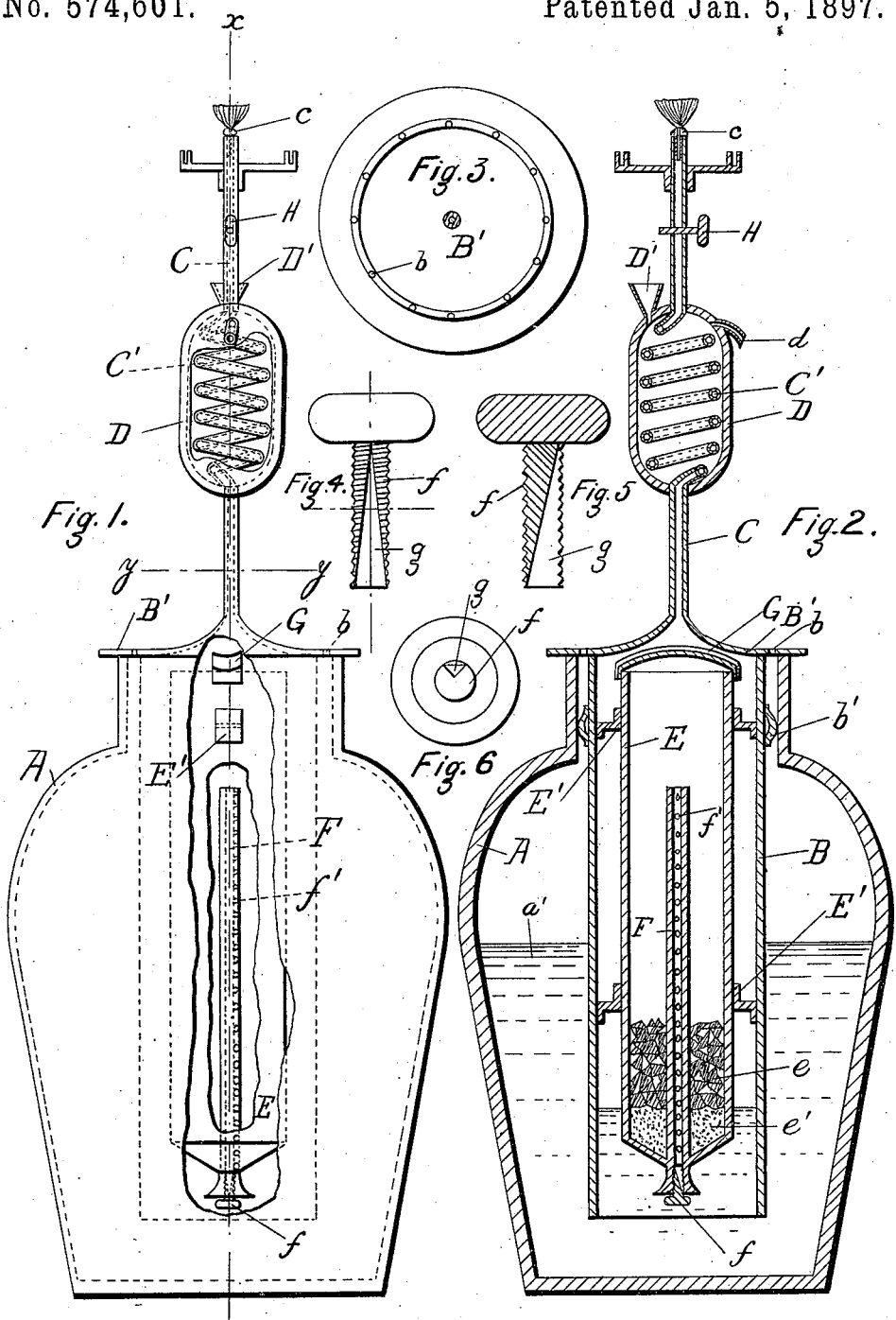

HENRI EDMOND CASGRAIN, OF QUEBEC, CANADA.

ACETYLENE-GAS-GENERATING LAMP.

SPECIFICATION forming part of Letters Patent No. 574,601, dated January 5, 1897.

Application filed May 20, 1896. Serial No. 592,284. (No model.)

*To all whom it may concern:*

Be it known that I, HENRI EDMOND CAS-GRAIN, a citizen of the Dominion of Canada, residing at the city of Quebec, in the district of Quebec and Province of Quebec, Canada, have invented certain new and useful Improvements in Lamps for Generating and Burning Acetylene Gas; and I do hereby declare the following to be a full, clear, and exact description of the invention, such as will enable others skilled in the art to which it appertains to make and use the same.

This invention relates to lamps for generating and burning acetylene gas; and it consists in the novel construction and combination of the parts hereinafter fully described and claimed.

In the drawings, Figure 1 is a side view of the lamp with portions of it broken away to expose its internal parts. Fig. 2 is a vertical section taken on the line $xx$ in Fig. 1. Fig. 3 is a sectional plan view from above taken on the line $yy$ in Fig. 1. Figs. 4, 5, and 6 are detail side, sectional, and plan views of the regulating-screw.

A is an external vessel partially filled with water $a'$.

B is a cylinder having an open bottom.

B' is the cover of the cylinder, secured to its top and resting on the neck of the vessel A. The cover B' is provided with air-holes $b$, communicating with the interior of the vessel A, and $b'$ are distance-pieces secured to the cylinder and holding it centrally in the neck of the vessel A.

C is the gas-pipe, projecting upwardly from the center of the cover B', and $c$ is the tip or burner, where the gas is ignited.

C' is a coil formed in the gas-pipe between the cover and the tip. D is a chamber surrounding the said coil and adapted to contain water.

D' is a funnel for filling the chamber with water, and $d$ is the overflow-pipe.

The water in the chamber D condenses the aqueous vapors in the coil, so that they do not pass upward to the tip.

E is a cylindrical vessel for holding the carbid of calcium $e$, and $e'$ is the lime resulting from the decomposition of the carbid.

The vessel E is supported within the cylinder B by springs E', secured to the side of the vessel E and pressing against the sides of the cylinder B.

F is a perforated pipe projecting upwardly within the vessel E, and $f$ is a regulating-screw for permitting the water in the vessel A to pass in a small regulated quantity upward into the pipe F, and thence through its perforations $f'$ into the vessel E.

The lowest part of the vessel E is arranged so that it is always above the open lower end of the cylinder B.

G is a drip-catcher at the top of the vessel E and under the gas-pipe. The drip-catcher is arch-shaped in form and has a concave upper surface. The ends of the drip-catcher are secured to the opposite sides of the vessel E, leaving spaces or openings on each side for the passage of gas from the vessel E to the gas-pipe. This drip-catcher prevents any water formed in the gas-pipe from dripping into the vessel E.

The regulating-screw $f$ is provided with a wedge-shaped slot $g$ in one side of it, and the passage of water to the carbid is regulated by turning the screw $f$.

H is a valve in the upper part of the gas-pipe for regulating the flow of gas to the tip.

The water decomposes the carbid when brought in contact with it, and acetylene gas is formed. When the valve H is closed, the gas accumulates in the vessel E and cylinder B, and its pressure forces the water in the cylinder B downward. When the level of the water in the cylinder is forced below the lowest perforation which communicates with the carbid, the supply of water to the carbid is cut off and the formation of gas ceases.

When the valve H is opened, the gas can be ignited at the tip and will burn until the supply of carbid is exhausted.

What I claim is—

1. In a lamp, the combination, with an outer vessel for holding water, of a cylinder open at the bottom and provided with means for regulating the passage of gas from its upper part, said cylinder being supported in the said vessel, and a vessel for holding carbid of calcium supported in the said cylinder and provided with an upwardly-projecting perforated pipe having a valve at its lower part for permitting the water to enter in prearranged quantity to act upon the carbid, substantially as set forth.

2. In a lamp, the combination, with an outer vessel for holding water, of a cylinder provided with a cover and a gas-pipe at its upper end and supported in the said outer vessel, a vessel for holding carbid of calcium supported above the open bottom of the said cylinder and provided with an upwardly-projecting perforated pipe, and a regulating-screw provided with a wedge-shaped groove and controlling the passage of water to the carbid, substantially as set forth.

In testimony whereof I affix my signature in presence of two witnesses.

HENRI EDMOND CASGRAIN.

Witnesses:
   THOMAS CASAULT,
   A. G. DRULLET.